United States Patent [19]
Nagase et al.

[11] 3,884,775
[45] May 20, 1975

[54] ELECTROLYTIC PROCESS FOR PRODUCTION OF CHLOROFLUORINATED ETHERS

[75] Inventors: Shunji Nagase; Hajime Baba; Kazuo Kodaira, all of Nagoya; Kooshi Okazaki, Saitama-ken, all of Japan

[73] Assignee: Agency of Industrial Science & Technology, Tokyo, Japan

[22] Filed: Mar. 12, 1973

[21] Appl. No.: 340,601

[30] Foreign Application Priority Data
June 14, 1972   Japan.............................. 47-59185

[52] U.S. Cl.............................................. 204/59 F
[51] Int. Cl.............................................. B01k 3/00
[58] Field of Search ......................... 204/59, 59 F

[56] References Cited
UNITED STATES PATENTS

| | | | |
|---|---|---|---|
| 2,519,983 | 8/1950 | Simons | 204/59 F |
| 2,601,014 | 6/1952 | Wolfe | 204/59 F |
| 3,511,760 | 5/1970 | Fox et al. | 204/59 F |

FOREIGN PATENTS OR APPLICATIONS

| | | | |
|---|---|---|---|
| 740,723 | 11/1955 | United Kingdom | 204/59 F |

*Primary Examiner*—R. L. Andrews
*Attorney, Agent, or Firm*—Kurt Kelman

[57] ABSTRACT

Partially chlorinated ethers are electrolytically fluorinated in anhydrous hydrogen fluoride. The gas which is produced consequently is passed through water and the aqueous solution of sodium sulfite-sodium hydroxide for the removal of by-products and thereafter cooled and collected. The collected product is a mixture consisting of fluorinated ethers and fluorocarbons. Chlorofluoroethers which the present invention aims to obtain are separated from this mixture by additional treatments of distillation, gas chromatography, etc.

2 Claims, No Drawings

ELECTROLYTIC PROCESS FOR PRODUCTION OF CHLOROFLUORINATED ETHERS

BACKGROUND OF THE INVENTION

This invention relates to a process for the production of fluorinated ethers, particularly chlorofluoroethers.

Chlorofluoroethers are important organic fluorine compounds which are useful as solvents, as stabilizers for solvents of haloalkane series, as sprays and anesthetics and for many other applications.

A method which involves the reaction of such fluorinating agent as antimony trifluoride with chloroethers, a method which utilizes the reaction of cobalt trifluoride with partially chlorofluorinated ethers, a method which resorts to the reaction of alcohols with chlorofluoro-olefins, a method which relies on the reaction of chlorine gas with fluoroethers, and so on have heretofore been disclosed as useful techniques for the production of chlorofluoroethers.

The method which uses antimony trifluoride, however, is useful only on an extremely limited number of applications because this fluorinating agent cannot effect the substitution of hydrogen atoms with fluorine atoms, though it permits the substitution of chlorine atoms with fluorine atoms. What is more, this method cannot produce chloropolyfluoroether. The method utilizing cobalt trifluoride has a disadvantage that it is difficult to practice on a commercial scale because the production of cobalt trifluoride inevitably involves use of fluorine gas which is hazardous to operators handling it. The method which uses chlorofluoro-olefins and fluoroethers as the starting materials also has a disadvantage that the production of these raw materials involves numerous stages of operation and the production of chlorofluoroethers is difficult with this method. The conventional methods more or less involve drawbacks which make their commercial application difficult.

A primary object of the present invention is to provide a process for easy production of fluorinated ethers, particularly chlorofluoroethers from readily available raw materials in a single-stage operation.

SUMMARY OF THE INVENTION

To accomplish the object described above, the process of the present invention produces fluorinated ethers by subjecting chloroethers to electrolytic fluorination in anhydrous hydrogen fluoride. The gaseous mixture which is obtained consequently contains carbonyl fluoride, perfluorocarboxylic acid fluoride, oxygen difluoride, chlorine, hydrogen, etc. in addition to halogenated ethers and fluorocarbons. Carbonyl fluoride and perfluorocarboxylic acid fluoride can be removed from the mixture by washing the gaseous mixture with water. Removal of oxygen difluoride, chlorine and so on can be effected by having them absorbed by the aqueous solution of sodium sulfite-sodium hydroxide. By further treatments of distillation, gas chromatography, etc, halogenated ethers can be removed from the remaining products.

DETAILED DESCRIPTION OF THE INVENTION

Heretofore, it has been known that fluoroethers are produced by the electrolytic fluorination of ethers containing no chlorine atom (U.S. Pat. No. 2,500,388 and U.S. Pat. No. 2,519,983). It has been found quite unexpectedly that, when ethers which have in advance been substituted with chlorine atoms are subjected to the electrolytic fluorination, the chlorine atoms are retained within the molecules of ethers and there are consequently obtained chlorofluoroethers.

The present invention has been accomplished on the basis of this knowledge. The inventors carried out a devoted study to seek a process whereby chlorofluoroethers are produced by a simple treatment of readily available raw materials. Consequently, they have made a discovery that chlorofluoroethers can be produced in a single-stage operation by subjecting chloroethers to electrolytic fluorination in anhydrous hydrogen fluoride.

Examples of the partially chlorinated ethers which may be used for the present invention are chloro-aliphatic ethers such as 2,2'-dichloroethyl ether, pentachloroethylmethyl ether, 2,2,2-trichloroethylmethyl ether and trichlorovinylmethyl ether; chlorofluoro-aliphatic ethers such as allyl-2-chloro-1,1,2-trifluoroethyl ether, 2-chloro-1,1,2-trifluoroethyl-1,2,2,-trichloroethyl ether, 2,2,2-trichloro-1,1-difluoroethylmethyl ether and 2,2-dichloro-1,1,2-trifluoroethyl-trichloromethyl ether; and chloro-aromatic ethers such as chloroethylphenyl ether and 2-chloroethylbenzyl ether.

To effect the electrolytic fluorination of such compounds, a given compound is added to anhydrous hydrogen fluoride by an amount of 1 – 25% (by weight) based on the electrolysis solution and subjected to electrolysis in a suitable electrolyzing bath.

One example of the electrolyzing cell which may be used for this purpose is such that 8 anodes of nickel plate and 7 cathodes of nickel plate are arranged alternately in an ironmade cell which is provided on the bottom portion thereof with a bubbler.

The conditions for the electrolysis are to be selected from the following ranges: Anode current density between 0.5 and 4.0 A/dm$^2$, bath temperature between $-10°$ and $+20°$C and bath voltage between 4 ad 9 V. In the case of electrolysis, there is no particular need for adding any agent for improving electroconductivity of the bath. Where polychloroethers having high chlorine atom contents are used as the starting materials, addition of alkali fluoride to the bath proves to be desirable.

In the course of reaction, an inert gas such as helium is introduced through the bubbler disposed at the bottom of the cell so that finely divided bubbles of the gas are passed upwardly through the bath to disperse the heat liberated because of the reaction, agitate the hydrogen fluoride solution to make the reaction proceed mildly and accelerate the vaporization of the reaction product. By this introduction of the inert gas, even a reaction product having a fairly high boiling point can be vaporized and collected.

When the compound selected as the raw material is subjected to the electrolytic fluorination according to the method of this invention, there is produced a gaseous mixture containing carbonyl fluoride, perfluorocarboxylic acid fluoride, oxygen difluoride, chlorine, hydrogen chloride, hydrogen, etc. in addition to halogenated ethers and fluorocarbons. Of these components, carbonyl fluoride and perfluorocarboxylic acid fluoride can be removed by washing the produced gas with water. The removal of oxygen difluoride, chlorine and the like can be effected by having them absorbed by the aqueous solution of sodium sulfite-sodium hydroxide. The halogenated ethers and fluorocarbons are collected in a cooling trap and separated from hydrogen gas and, thereafter, separated from one another by means of distillation, gas chromatography, etc. The identity of the chlorofluoroethers thus obtained can be confirmed by elementary analysis, infrared spectrometry, mass spectrometry, nuclear magnetic resonance spectrometry, etc.

When the product of electrolytic fluorination has a very high boiling point, it settles to the bottom of the electrolyzing bath. In this case, the product collecting at the bottom is withdrawn from the bath by opening the drain cock disposed on the cell bottom, freed from hydrogen fluoride by the treatment with the aqueous solution of an alkali, dehydrated with anhydrous sodium sulfate or some other suitable substance added thereto, and refined such as by distillation to obtain the desired halogenated ether.

The reaction can be carried out not merely batchwise. It may also be performed continuously when the electrolyzing bath is replenished from time to time with the raw material and anhydrous hydrogen fluoride as they are consumed gradually with the progress of the reaction.

As is clear from the preceding explanation, the method of the present invention permits chlorofluoroethers, the production of which has been extremely difficult with the conventional methods, to be produced in a simple single-stage process using readily available starting materials and fluorine sources and a simple reaction device. Further, it can control the reaction such as by the use of an inert gas. Thus, the present method is quite suitable for commercial operation. This method, therefore, can be applied not only to the production of chlorofluoroethers from chloroethers but equally to the production of chloropolyfluoroethers through the fluorination of chlorofluoroethers of low degree of fluorination.

Now, the present invention is described with reference to some working examples. These examples are illustrative of the invention and not limitative in any way of the invention.

EXAMPLE 1

An iron-made electrolyzing cell with a volume of 450 ml was used as the reaction vessel. In this cell, 8 nickel-plate anodes and 7 nickel-plate cathodes were arranged alternately and a bubbler made of polytetrafluoroethylene fiber was disposed on the bottom. Each electrode has an effective area of 7.7 dm$^2$.

This electrolyzing cell was provided, at the product outlet on the top thereof, with a reflux condenser, an iron-made tube packed with sodium fluoride pellets, a polyethylene-made wash bottle filled with water, a glass wash bottle packed with the aqueous solution of sodium sulfite-sodium hydroxide containing a small amount of potassium iodide, an ice-cooled trap and a liquefied nitrogen-cooled trap which were connected in series.

Anhydrous hydrogen fluoride (450 ml) which had ben deprived of impurities (mostly of water) by electrolysis was placed in the electrolyzing cell. Electrolysis was performed under conditions of anode current density 2.6 - 3.0 A/dm$^2$, bath voltage 6–7 V and bath temperature 8°–10°C, while 32.3 g (0.200 mol) of trichlorovinylmethyl ether (CH$_3$OCCl=CCl$_2$) was introduced portionwise. In the course of electrolysis, helium was blown into the electrolyzing bath at a flow rate of 150 m/min via the bubbler on the bottom of the cell.

The gas evolved from the electrolyzing bath was led through the condenser, the tube of sodium fluoride, the gas wash bottle and the traps cooked with ice and with liquefied nitrogen. This electrolysis was continued for 58 A. hours. On completion of the electrolysis, the bath voltage rose sharply to 9.0 V.

In the cooling trap was collected a total of 37.1 g of the product of electrolysis. From this product were obtained 6.6 g of 2-chloro-1,1,2,2,-tetrafluoroethyltrifluoromethyl ether (CF$_3$OCF$_2$CF$_2$Cl, B.P. 11°C), 2.1 g of 2-chloro-1,1,2,2-tetrafluoroethyldifluoromethyl ether (CHF$_2$OCF$_2$CF$_2$Cl, B.P. 29°C), 13.7 g of 2,2-dichloro-1,1,2-trifluoroethyltrifluoromethyl ether (CF$_3$OCF$_2$CFCl$_2$, B.P. 42°C) and 4.3 g of 2,2-dichloro-1,1,2-trifluoroethyldifluoromethyl ether (CHF$_2$OCF$_2$CFCl$_2$, B.P. 64°C). The combined yield of these chlorofluoroethers was found to be 59%. Other products were fluoroethers, chlorofluorocarbons, fluorocarbons, etc.

EXAMPLE 2

Under substantially the same conditions, 35.0 g (0.234 mol) of trichloromethylmethyl ether (CCl$_3$OCH$_3$) was electrolytically fluorinated for 29 A. hours. From 26.6 g of the product of electrolysis collected in the trap, there was obtained 3.6 g of chlorodifluoromethylmethyl ether (CF$_2$ClOCH$_3$, B.P. 17°C), the yield thereof being 13%. Other products were fluoroethers, fluorocarbons, etc.

EXAMPLE 3

Under substantially the same conditions, 44.0 g (0.154 mol) of 2,2-dichloro-1,1,2-trifluoroethyltrichloromethyl ether was electrolytically fluorinated. After 61 A. hours of electrolysis, there was collected 33.4 g of product of electrolysis.

From this product were obtained 5.7 g of 2-chloro-1,1,2,2-tetrafluoroethyltrifluoromethyl ether (CF$_3$OCF$_2$CF$_2$Cl), 8.4 g of a mixture containing 2,2-dichloro-1,1,2-trifluoroethyltrifluoromethyl ether (CF$_3$OCF$_2$CFCl$_2$) and 1-chloro-1,1,2,2-tetrafluoroethylchlorodifluoromethyl ether (CF$_2$ClOCF$_2$CF$_2$Cl, P.P. 43°C), 15.2 g of 2,2-dichloro-1,1,2-trifluoroethylchlorodifluoromethyl ether (CF$_2$ClOCF$_2$CFCl$_2$, B.P. 78°C) and 0.5 g of 2,2-dichloro-1,1,2-trifluoroethyldichlorofluoromethyl ether (CFCl$_2$OCF$_2$CFCl$_2$, B.P. 111°C). The combined yield of these chlorofluoroethers was found to be 80%. Other products were fluoroethers, chlorofluorocarbons, fluorocarbons, etc.

EXAMPLE 4

Under substantially the same conditions, 20.2 g (0.080 mol) of 2,2-dichloro-1,1,2-trifluoroethyldichloromethyl ether (CHCl$_2$OCF$_2$CFCl$_2$) was electrolytically fluorinated. After 34 A. hours of electrolysis, there was collected 15.5 g of product of electrolysis.

From this product was obtained 4.9 g of 2-chloro-1,1,2,2-tetrafluoroethyltrifluoromethyl ether (CF$_3$OCF$_2$CF$_2$Cl), 3.0 g of 2-chloro-1,1,2,2-tetrafluoroethyldifluoromethyl ether (CHF$_2$OCF$_2$CF$_2$Cl), 2.4 g of 2,2-dichloro-1,1,2-trifluoroethyltrifluoromethyl ether (CF$_3$OCF$_2$CFCl$_2$), 1.3 g of 2,2-dichloro-1,1,2-trifluoroethyldifluoromethyl ether (CHF$_2$OCF$_2$CFCl$_2$) and 0.3 g of 2,2-dichloro-1,1,2-trifluoroethylchlorodifluoromethyl ether (CF$_2$ClOCF$_2$CFCl$_2$). The combined yield of these chlorofluoroethers was found to be 67%. Other products were fluoroethers, chlorofluorocarbons, fluorocarbons, etc.

What is claimed is:

1. A process for production of chlorofluoroethers which comprises, dissolving partially chlorinated ethers in anhydrous hydrogen fluoride to form a solution thereof wherein 1–25% by weight of the partially chlorinated ether based on the anhydrous hydrogen fluoride is dissolved in the anhydrous hydrogen fluoride, said partially chlorinated ether being one member selected from the group consisting of 2,2'-dichloroethyl ether, pentachloroethylmethyl ether, 2,2,2-trichloroethylmethyl ether, trichlorovinylmethyl ether, allyl-2-chloro-1,1,2-trifluoroethyl ether, 2-chloro-1,1,2-trifluoroethyl-1,2,2-trichloroethyl ether, 2,2,2-trichloro-1,1-difluoroethylmethyl ether, and 2,2-dichloro-1,1,2-trifluoroethyltrichloromethyl ether, electrolyzing said solution in an alternately nickel-plate anode-cathode electrolyzing cell wherein the anode current density is between 0.5 and 4.0 A/dm$^2$, bath temperature is between −10° and +20°C and bath voltage is between 4 and 9 V., removing impurities and by-products from gas evolved from the electrolyzing cell and thereafter recovering chlorofluoroethers, said chlorofluoroethers being the same in construction and in number of carbon atoms as said partially chlorinated ethers and being selected from the group consisting of 2-chloro-1,1,2,2-tetrafluoroethyltrifluoromethyl ether, 2-chloro-1,1,2,2-tetrafluoroethyldifluoromethyl ether, 2,2-dichloro-1,1,2-trifluoroethyltrifluoromethyl ehter, 2,2-dichloro-1,1,2-trifluoroethyldifluoromethyl ether, chlorodifluoromethylmethyl ether, 1-chloro-1,1,2,2-tetrafluoroethylchlorodifluoromethyl ether, 2,2-dichloro-1,1,2-trifluoroethylchlorodifluoromethyl ether, 2,2-dichloro-1,1,2-trifluoroethyldichlorofluoromethyl ether.

2. The process of claim 1, wherein impurities and by-products are removed by washing with water and a mixture of sodium hydroxide and sodium sulfite.

* * * * *